United States Patent
Huang et al.

(10) Patent No.: US 8,160,733 B2
(45) Date of Patent: Apr. 17, 2012

(54) AUDIO SYSTEM FOR AN INFORMATION HANDLING SYSTEM

(75) Inventors: Hai Huang, Shanghai (CN); Yi Ming Hua, Shanghai (CN); Tao Wang, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 1060 days.

(21) Appl. No.: 12/046,665

(22) Filed: Mar. 12, 2008

(65) Prior Publication Data

US 2009/0112339 A1    Apr. 30, 2009

(30) Foreign Application Priority Data

Oct. 26, 2007    (CN) .......................... 2007 1 01675447

(51) Int. Cl.
*G06F 17/00* (2006.01)
(52) U.S. Cl. ........................................................ 700/94
(58) Field of Classification Search ................... 700/94; 710/8, 62, 66
See application file for complete search history.

(56) References Cited

U.S. PATENT DOCUMENTS

| | | | |
|---|---|---|---|
| 6,007,228 A | 12/1999 | Agarwal et al. | 364/400.01 |
| 6,374,148 B1 | 4/2002 | Dharmarajan et al. | 700/94 |
| 7,095,867 B2* | 8/2006 | Schul et al. | 381/334 |
| 2005/0276426 A1* | 12/2005 | Ono et al. | 381/104 |
| 2007/0230910 A1* | 10/2007 | Welch et al. | 386/96 |

OTHER PUBLICATIONS

Gizmodo UK: Creative X-Fi: Upgrade Your Laptop Audio Via USB, 3 pages, May 13, 2008.
Vasily Melnik, Creative SB Audigy 2 ZS Notebook: Serious Audio for Portable Systems, X-bits Labs, 16 pages, Aug. 31, 2005.

* cited by examiner

*Primary Examiner* — Andrew C Flanders
(74) *Attorney, Agent, or Firm* — Baker Botts L.L.P.

(57) ABSTRACT

An audio system for an information handling system, the audio system comprising an audio interface operable to connect a mobile information handling device and a docking station, an audio module in the docking station, and an audio jack configured to connect the audio module to a speaker.

13 Claims, 4 Drawing Sheets

AUDIO SYSTEM FOR AN INFORMATION HANDLING SYSTEM

CROSS REFERENCE TO RELATED APPLICATION

This application claims priority to Chinese application number 2007101675447 filed Oct. 26, 2007, the contents of which is hereby incorporated by reference in its entirety.

TECHNICAL FIELD

The present invention is related to information handling systems and, more particularly, audio systems for an information handling system.

BACKGROUND OF THE INVENTION

As the value and use of information continues to increase, individuals and businesses seek additional ways to process and store information. One option for processing and storing information is an information handling system. An information handling system generally processes, compiles, stores, and/or communicates information or data for business, personal, educational, governmental, or other purposes thereby allowing users to take advantage of the value of the information.

Because technology and information handling needs and requirements vary between different users and/or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

One category of information handling systems is mobile information handling devices. As suggested by its name, a mobile information handling device might be described as an information handling system that is more portable than a traditional information handling device or system. Mobile information handling devices include, as examples, laptops, notebooks, personal digital assistants (PDA), portable computers, tablet computers, wearable computers, and cell phones. Mobile information handling devices may serve as information handling systems or may include one or more components of a larger information handling system.

Mobile information handling devices may be part of more complex information handling systems and may be connected to such systems by a variety of devices and/or components (e.g., wireless networks, cables, modems, etc.). One typical connection is made by connecting a mobile information handling device to a port replicator. One example of a port replicator is known as a docking station. A port replicator or docking station typically serves as a stationary base for a mobile information handling device. Docking stations may include connectors or other devices that are not included in the mobile information handling device (e.g., network connections, hard drive bays, optical drive bays, keyboard/mouse connectors, USB ports, PC Card slots, external display connectors, etc.). These devices may be placed on a port replicator or docking station for a variety of reasons (e.g., weight, space limits, power consumption, and/or thermal properties). In addition, a port replicator may connect a mobile information handling device to all of these connections and/or devices through a single connecting step, rather than one for each connection or device.

Currently, many mobile information handling devices include an audio system operable to play music or sound. In fact, some mobile information handling devices such as laptop computers may include one or more speakers integrated with the laptop case or housing. Some smaller mobile information handling devices may lack an audio system for reasons related to weight, space restrictions, power consumption, and/or thermal properties.

FIG. 1 depicts an information handling system 1 including a prior art laptop computer 10 and an audio system 20 used therewith. In the prior art solution, laptop 10 may include a keyboard 12, a display 14, and a case 16. Integrated audio system 20 may include integrated speakers 22, and a 2-channel speaker/headphone connection 24.

Laptop computer 10 may include any mobile information handling device. For example, laptop computer 10 may include any small mobile computer. Keyboard 12 may include any arrangement of buttons and/or keys designed for the input of text, characters, and/or operational controls for laptop computer 10. Display 14 may include any information display for visual presentation of images, texts, and/or other output from laptop computer 10. Case 16 may include any chassis, cabinet, tower, box, and/or enclosure appropriate for housing laptop computer 10.

Laptop computer 10 may include processing resources, e.g., one or more central processing units (CPUs) and storage resources that are accessible to the processing resources. Storage resources may include volatile storage or memory and/or persistent storage, e.g., disk storage, flash memory or other type of erasable read only memory (ROM), and the like. Laptop computer 10 may also include various other peripheral or I/O devices known in the field of data processing system design.

Integrated audio system 20 may include any combination of devices and/or components configured to produce audio signals (e.g., an electromechanical transducer). For example, integrated audio system 20 may include integrated speakers 22, and/or a connection 24. Integrated speakers 22 may include any component or device configured to convert an electronic signal into sound and housed within and/or attached to case 16. Connection 24 may include any device or component configured to provide a 2-channel speaker/headphone connection to audio system 20 (e.g., speakers or headphones).

Prior art integrated audio systems 20, such as that shown in FIG. 1, may provide limited performance because of space, power, and/or thermal limitations imposed by case 16 and/or other components of laptop computer 10. For example, the design of laptop computer 10 may be constrained by a weight target, a size target, and/or any other physical constraint affecting portability and/or comfort of the user.

In addition, many laptop computers 10 use miniaturized electronic components packed within case 16. Restrictions and/or concerns related to dissipation of thermal energy may restrict the addition of high performance audio components. The configuration of electronic components within laptop computer 10 may result in a complex electrical environment within case 16 including electromagnetic fields, fluctuating power supply, and/or other concerns which may restrict the selection of components of integrated audio system 20.

SUMMARY OF THE INVENTION

The present disclosure describes a system and method for providing an audio system for an information handling system. Although the following discussion focuses on audio systems in the context of docking stations and/or port replicators, these teachings may be used in a variety of applications related to audio systems for information handling systems.

In one embodiment, the present disclosure provides an audio system for an information handling system. The audio system may include an audio interface configured to connect a mobile information handling device and a port replicator, an audio module in the port replicator, and an audio jack configured to connect the audio module and a speaker.

In another embodiment, the present disclosure provides an information handling system. The information handling system may include a mobile information handling device including an audio controller, a port replicator, an audio module in the port replicator, an audio interface configured to connect the mobile information handling device and the audio module in the port replicator, and an audio jack configured to connect the audio module and a speaker.

In another embodiment, the present disclosure provides a computer program product comprising computer executable instructions, stored on a computer readable medium, for providing an audio system for a mobile information handling device. The computer program product may include instructions for detecting whether the mobile information handling device is connected to an audio system associated with a port replicator, where the audio system may include an audio module in the port replicator and an audio jack connecting the audio module to a speaker. The computer program product may include instructions for initializing the detected audio system, loading a driver for the detected audio system, and producing audio output through the detected audio system.

Embodiments of the present disclosure may include various technical advantages. One technical advantage of certain embodiments is the ability to provide high performance audio for mobile information handling devices. Additional advantages may be apparent to those of skill in the art and from the figures, description and claims provided herein.

BRIEF DESCRIPTION OF THE DRAWINGS

A more complete and thorough understanding of the present embodiments and advantages thereof may be acquired by referring to the following description taken in conjunction with the accompanying drawings, in which like reference numbers indicate like features, and wherein.

DETAILED DESCRIPTION OF THE INVENTION

Preferred embodiments of the invention and its advantages are best understood by reference to FIGS. 1-7 wherein like numbers refer to like and corresponding parts.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

For the purposes of this disclosure, computer-readable media may include any instrumentality, or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such wires, optical fibers, microwaves, radio waves, and other electromagnetic and/or optical carriers; and/or any combination of the foregoing.

The exemplary implementations of audio systems presented herein may emphasize audio systems in the context of laptop and notebook computers; it should be understood, however, that the audio systems described herein may also be appropriate for other classes of information handling systems including, as examples, hand held systems, personal digital assistants (PDA), portable computers, tablet computers, wearable computers, and cell phones.

Figure 1:
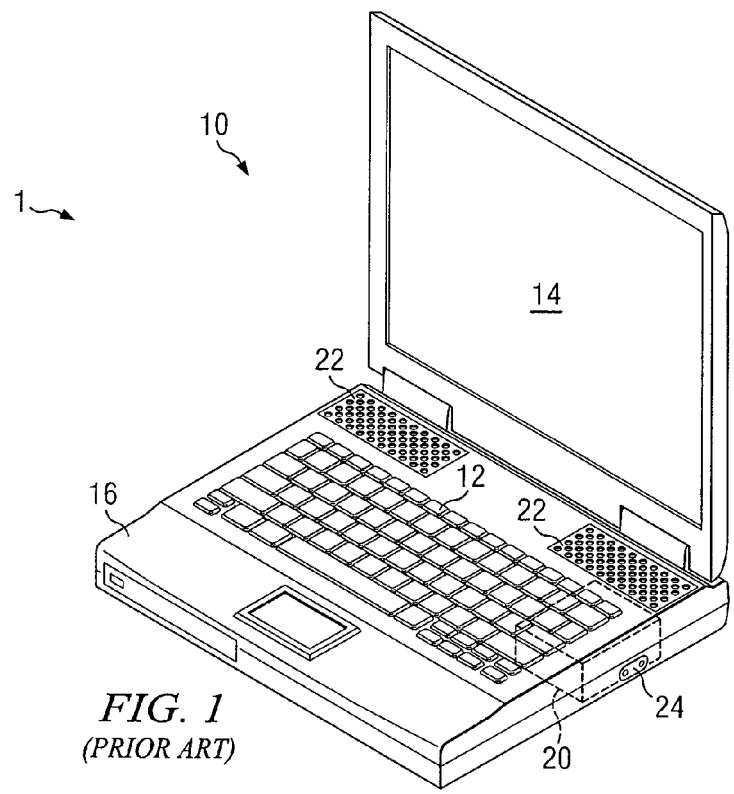
FIG. 1 depicts a prior art solution for providing an audio system for a mobile information handling device.
Figure 2:
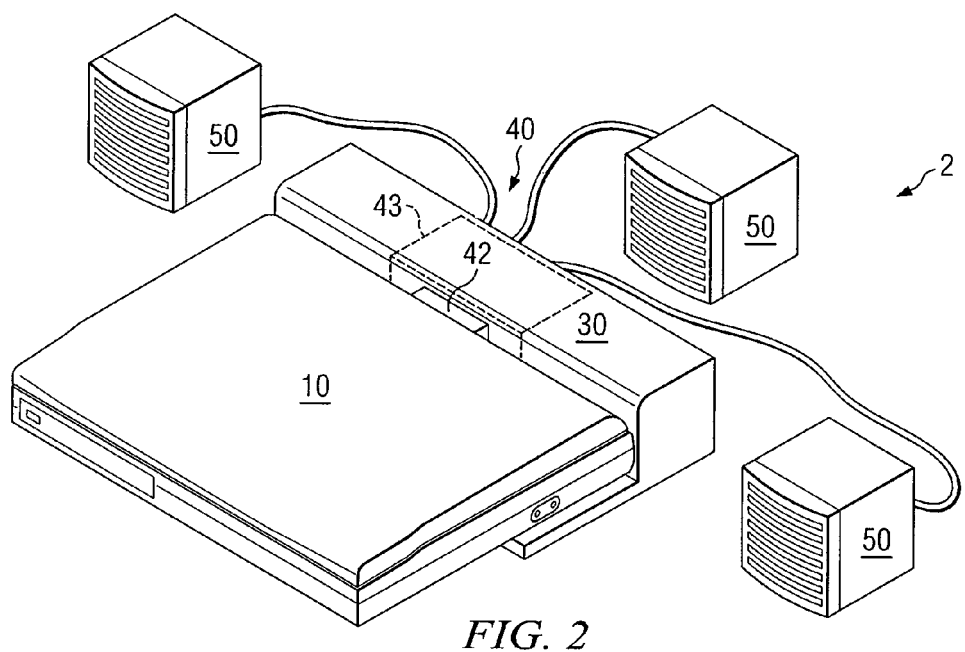
FIG. 2 depicts selected elements of an information handling system which may be used in accordance with teachings of the present disclosure.

FIG. 2 depicts selected elements of an information handling system incorporating teachings of the present disclosure. In the depicted embodiment, information handling system 2 may include a laptop computer 10, a port replicator 30, a port replicator audio system 40, and one or more speakers 50.

Figure 3:
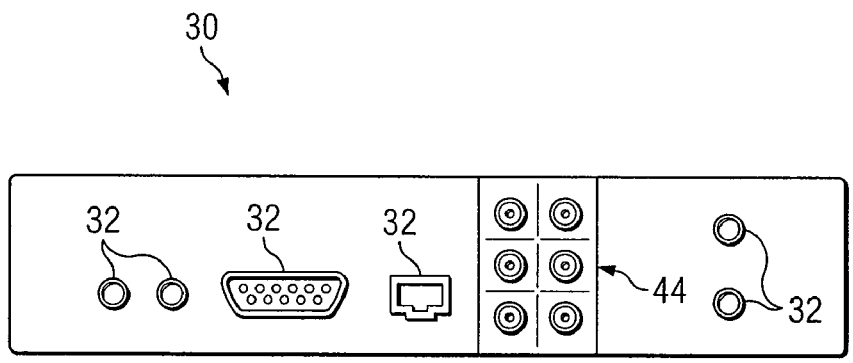
FIG. 3 depicts a rear view of one embodiment of a docking station which may be used in accordance with teachings of the present disclosure.

FIG. 3 depicts a rear view of one embodiment of port replicator 30 which may be used in accordance with teachings of the present disclosure.

With reference to FIGS. 2 and 3, port replicator 30 may be any component or device that provides a stationary base for a mobile information handling device. Port replicator 30 may include connectors or other devices that are not included in laptop computer 10 (e.g., network connections, hard drive bays, optical drive bays, keyboard/mouse connectors, USB ports, PC Card slots, external display connectors, etc.). Port replicator 30 may provide any connections and/or devices desired to facilitate use of laptop computer 10. For example, in the embodiment shown in FIG. 2, port replicator 30 houses audio system 40.

Audio system 40 may include an audio interface 42, an audio module 43, and an audio jack 44. Audio interface 42 may include any device and/or component configured to connect laptop computer 10 to audio module 43. Standard connectors may be useful with a wide variety of laptop computers 10 or mobile information handling devices. For example, audio interface 42 may include PCI Express, PCI, USB, high definition audio (HDA), HyperTransport, CSI, and/or any other input/output bus or interface.

Industry standards such as PCI and PCI-Express include audio and/or sound signal transfer. PCI Express, often abbreviated as PCI-E or PCIe, is a standardized expansion card interface format. In each lane, a common PCIe 1.1 link carries 250 MB of information in each direction. Each lane may simultaneously receive and transmit information.

Audio module 43 may include any component or device configured to process electronic signals transferred through audio interface 42. For example, as shown in FIG. 2, audio module 43 may receive an electronic signal from laptop computer 10 through audio interface 42. Audio module 43 may include, as examples, amplifiers, preamplifiers, and/or signal processors. In some embodiments, audio module 43 may be configured to provide high definition audio such as that compatible with Intel® High Definition Audio and/or Dolby TrueHD providing multiple channels of output. Audio module 43 may be configured to handle high-end entertainment formats (e.g., Blu-ray Disc, DVD-Audio, and/or HD DVD).

Audio jack 44 may include any device or component configured to connect audio module 43 to speaker(s) 50. In high-end systems, audio jack 44 may be configured to connect several speakers, depending on the format provided. For instance, audio jack 44 may provide 5.1, 6.1, and/or 7.1 channel output. Audio jack 44 may be similar to audio jacks provided on desktop computers, home stereos, tuners, and/or receivers.

Because of the space limitations inherent in most mobile information handling devices, placement of audio jack 44 on port replicator 30 in accordance with teachings of this disclosure may allow larger audio jacks 44 to be provided. In addition, because many audio jacks require multiple connections for speaker cables, placement of audio jack 44 on port replicator 30 in accordance with teachings of this disclosure may allow a user to connect his or her mobile information handling device to audio system 40 in a single step. For instance, the single step of placing a notebook computer in a docking station would connect the notebook to audio system 40.

It should be emphasized that the implementation of information handling system 2 as described above is merely exemplary, particularly with regard to the description of specific types of information handling systems and specific types of interfaces and protocols.

The embodiments described in relation to FIG. 2 may provide advantages in the performance of audio systems associated with mobile information handling devices. For example, such embodiments may allow larger audio module components, improved heat transfer, and/or a cleaner power management environment. Specifically, by moving audio components from case 16 to port replicator 30, larger audio jacks 44, amplifiers, preamplifiers, and/or other components may be used. Nonetheless, persons with ordinary skill in the art will be able to apply these teachings to a variety of components and embodiments.

Speaker 50 may include any component or device used to convert an electronic signal into sound. Teachings of the present disclosure may be used with any available speakers or sound systems.

As shown in FIG. 3, in addition to audio jack 44, port replicator 30 may include various connectors 32 for network connections, keyboard/mouse connectors, USB ports, PC Card slots, external display connectors, etc. Audio jack 44 may include any audio connectors known in the art, e.g., a 7.1 Channel jack. Audio jack 44 may include any connector designed for use with the teachings of this disclosure.

Figure 4:
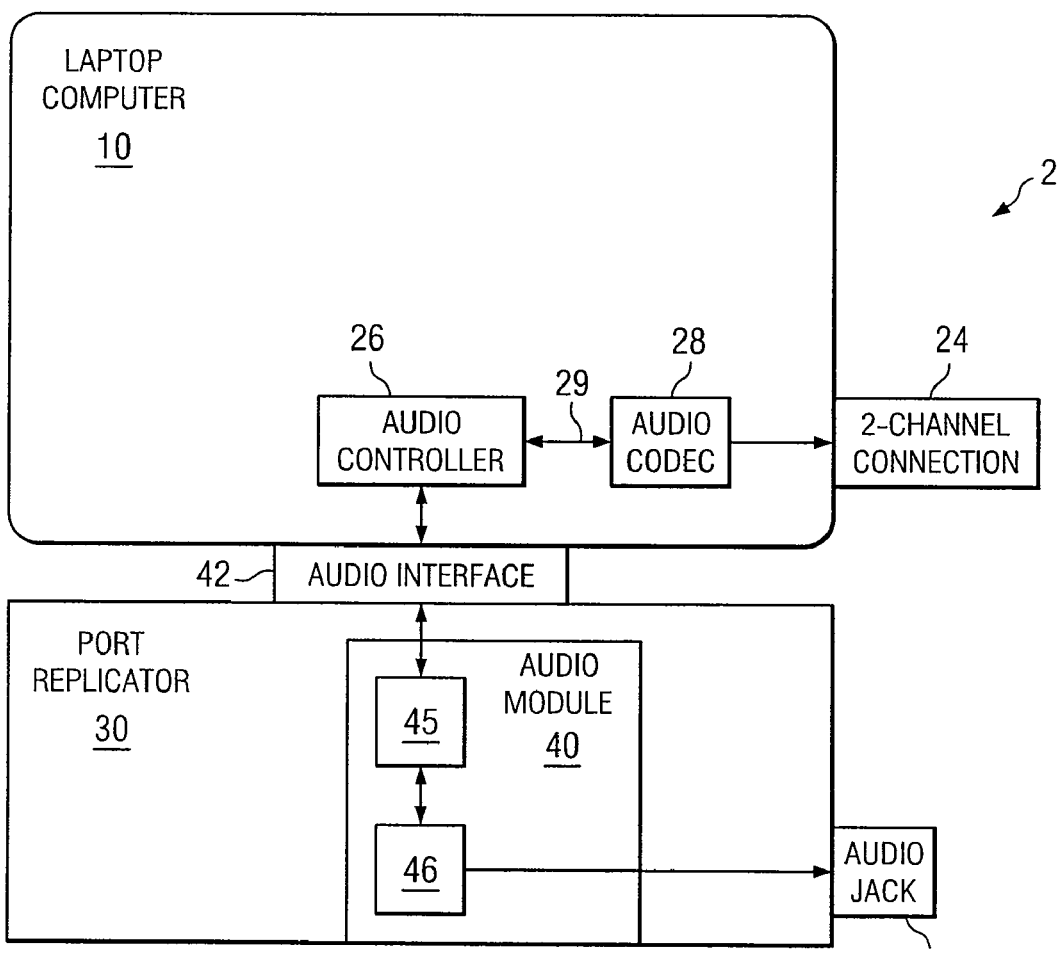
FIG. 4 depicts a block diagram showing one embodiment of an audio system for a mobile information handling device.

FIG. 4 depicts a block diagram showing one embodiment of an audio system 40 for a mobile information handling device. FIG. 4 shows a block diagram for laptop computer 10 which may be used with teachings of the present disclosure but is merely representative and does not restrict the teachings. In the embodiment shown in FIG. 4, laptop computer 10 may include an audio controller 26, an audio codec 28, and an interface 29.

Audio controller 26 may be any device or component configured to access, store, and/or play audio data. For example, audio controller 26 may include decoder circuitry configured to receive compressed audio data and send out a decompressed stream of audio data. Audio controller 26 may include circuitry configured to convert digital signals to analog signals. As another example, audio controller 26 may include one or more buffer memories configured for temporary storage of audio data.

Audio codec 28 may be any device or component configured to encode and/or decode a digital data stream or signal. For example, audio codec 28 may include executable software code configured to convert analog signals to digital and/or digital signals to analog. Audio codec 28 may use any of a large variety of formats known in the industry (e.g., Audio Interchange File Format (AIFF), Microsoft Wave format (WAV), Apple Lossless Audio Codec (ALAC), Dolby TrueHD, or MPEG-4 Audio Lossless Coding (MPEG-4 ALS)).

Interface 29 may include any component or device configured to transfer data between audio codec 28 and audio controller 26. There are a several known interfaces available to those having ordinary skill in the art. For example, interface 29 may include an HDA interface.

FIG. 4 also shows a block diagram of one embodiment of port replicator 30 which may be used with teachings of the present disclosure. As discussed with relation to FIG. 2, port replicator 30 may include audio connector 42, audio module 43, and audio jack 44. Audio connector 42, audio module 43, and audio jack 44 have been discussed in detail in relation to FIG. 2. Audio module 43 may also include audio processor 45 and audio output driver 46.

Audio processor 45 may be any device or component configured to access, store, and/or play audio data. For example, audio processor 45 may include decoder circuitry configured to receive compressed audio data and send out a decompressed stream of audio data. Audio processor 45 may include circuitry configured to convert digital signals to analog signals. As another example, audio processor 45 may include one or more buffer memories configured for temporary storage of audio data.

Audio output driver 46 may be any device or component configured to allow audio processor 46 to interact with speaker 50 through audio jack 44. For example, audio driver 46 may include executable code dependent on the software and/or firmware associated with audio processor 45, any operating system associated with laptop computer 10, and/or speaker(s) 50. Audio output driver 46 may translate generic commands from audio processor 45 to one or more specific speakers 50.

Audio systems 40 for use in accordance with teachings of the present disclosure may provide a user with several options for handling audio output. For example, a user may choose to disable any integrated audio systems 20 present in the mobile information handling device. As another option, a user may choose to have the mobile information handling device detect whether an audio system 40 is present and then use audio system 40 if available.

Figure 5:
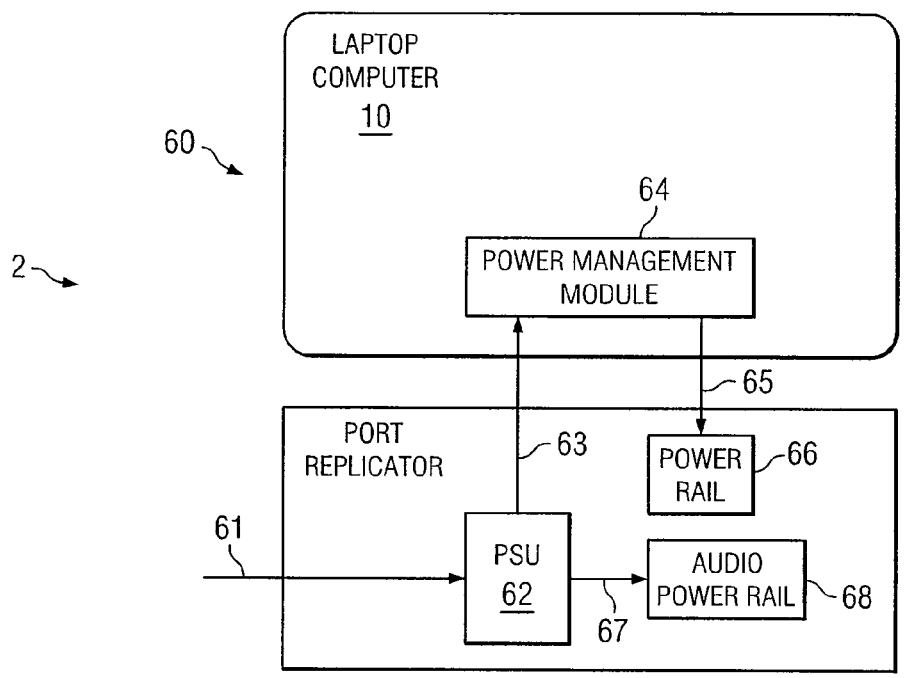
FIG. 5 depicts a block diagram showing one embodiment of a power management system for use with an audio system in accordance with teachings of the present disclosure.

FIG. 5 depicts a block diagram showing one embodiment of a power management system 60 for use with an audio system in accordance with teachings of the present disclosure. Power management system 60 may include any combination of devices or components configured to provide power to laptop computer 10 and audio system 40. Power management system 60 may include a power supply unit 62, a laptop power management module 64, a port replicator supply power rail 66, and a dedicated audio power supply rail 68.

Power supply unit 62 may include any device or component configured to supply electrical power to one or more components. For example, power supply unit 62 may be configured to convert 110 or 220 volt alternating current to a regulated lower voltage direct current. There are several known power supply units in the art. Power supply unit 62 may be configured to provide current to more than one circuit, such as laptop circuit 63 and/or dedicated audio power supply rail circuit 67, as shown in FIG. 5.

In an example embodiment, power supply unit 62 receives alternating current 61 supplied by a power outlet at 110 volts. Power supply unit 62 regulates and converts alternating current input 61 into 19 volt direct current supplied to laptop circuit 63 and 5 volt or 3.3 volt direct current supplied to dedicated audio power supply rail circuit 67.

Laptop power management module 64 may be any device or components configured to receive power and regulate and/or disperse power to components associated with laptop computer 10. Laptop power management module 64 may be configured to provide power to port replicator power supply rail 66 through laptop power output circuit 65. Separation of the power supplied to laptop power management module 64 and audio module 43 may increase the performance of audio system 40 by providing a cleaner supply of power.

A power support rail refers to a single voltage provided by power supply unit 62. For example, port replicator power supply rail 66 may include a 19 volt or 12 volt power supplied to components within port replicator 30. As another example, dedicated audio power supply rail 68 may include a 5 volt or 3.3 volt power supplied to audio module 43. Many known audio circuits use 5 volts or 3.3 volts as input.

Figure 6:
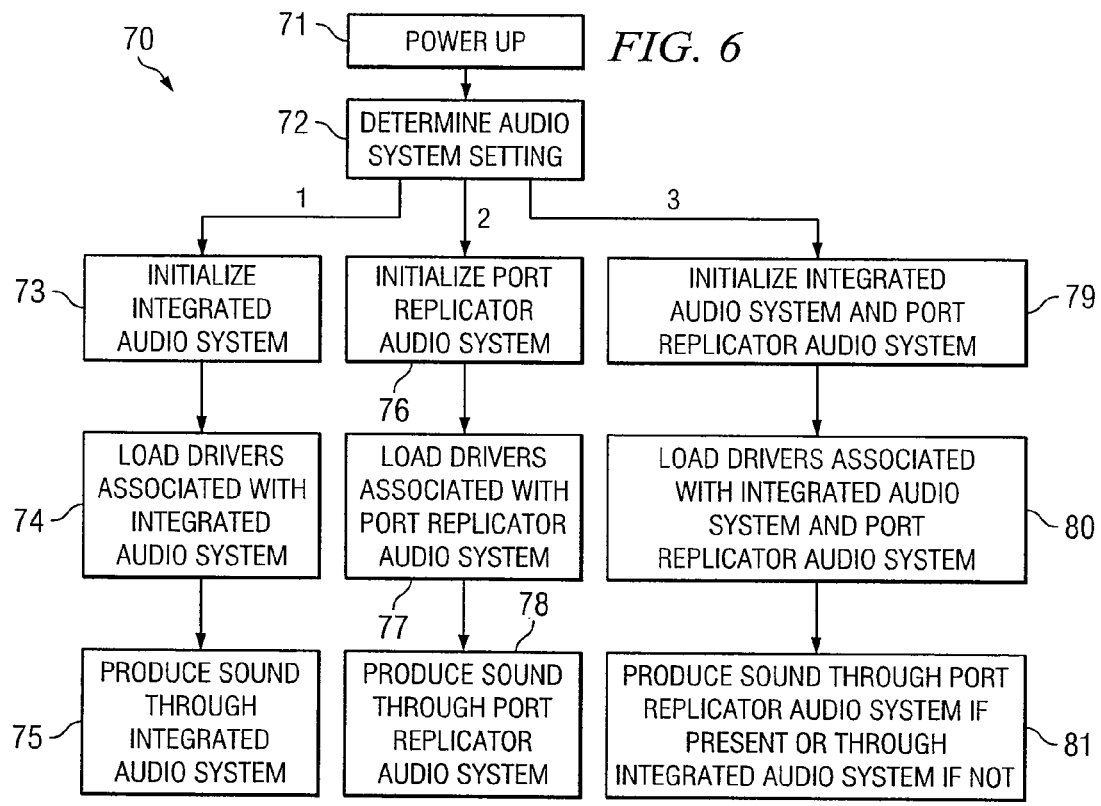
FIG. 6 depicts a flow diagram illustrating a method for providing an audio system for a mobile information handling device.

FIG. 6 depicts a flow diagram illustrating an example method 70 for providing an audio system for a mobile information handling device. Method 70 may be used to provide an audio system for a mobile information handling device if it is powered up while connected to port replicator 30.

At Step 71, the mobile information handling device may begin the power up process. This may occur in reaction to a regularly scheduled power up, a reboot, or any user initiated start up.

At Step 72, the mobile information handling device may determine the audio system setting. In one embodiment, Step 72 may be conducted by a boot monitor associated with the mobile information handling system. For example, as shown in FIG. 6, there may be three options for setting the audio system In this embodiment, the three settings may be: (1) use integrated audio system 20; (2) use port replicator audio system 40; or (3) automatic. The automatic setting may include using any available port replicator audio system 40 if available, and otherwise using integrated audio system 20.

For option 1, at step 73, the mobile information handling device may initialize integrated audio system 20. In one embodiment, Step 73 may be conducted by a boot monitor associated with the mobile information handling system.

At Step 74, the mobile information handling device may load one or more drivers associated with integrated audio system 20. In one embodiment, Step 73 may be conducted by an operating system associated with the mobile information handling system.

At Step 75, the mobile information handling device may produce sound through integrated audio system 20.

For option 2, at step 76, the mobile information handling device may initialize port replicator audio system 40. In one embodiment, Step 76 may be conducted by a boot monitor associated with the mobile information handling system.

At Step 77, the mobile information handling device may load one or more drivers associated with port replicator audio system 40. In one embodiment, Step 77 may be conducted by an operating system associated with the mobile information handling system.

At Step 78, the mobile information handling device may produce sound through port replicator audio system 40.

For option 3, at step 79, the mobile information handling device may initialize integrated audio system 20 and port replicator audio system 40 if present. In one embodiment, Step 79 may be conducted by a boot monitor associated with the mobile information handling system.

At Step 80, the mobile information handling device may load one or more drivers associated with integrated audio system 20 and port replicator audio system 40 if present. In one embodiment, Step 80 may be conducted by an operating system associated with the mobile information handling system.

At Step 81, the mobile information handling device may produce sound through port replicator audio system 40 if present, or through integrated audio system 20 if port replicator audio system 40 is not present.

Figure 7:
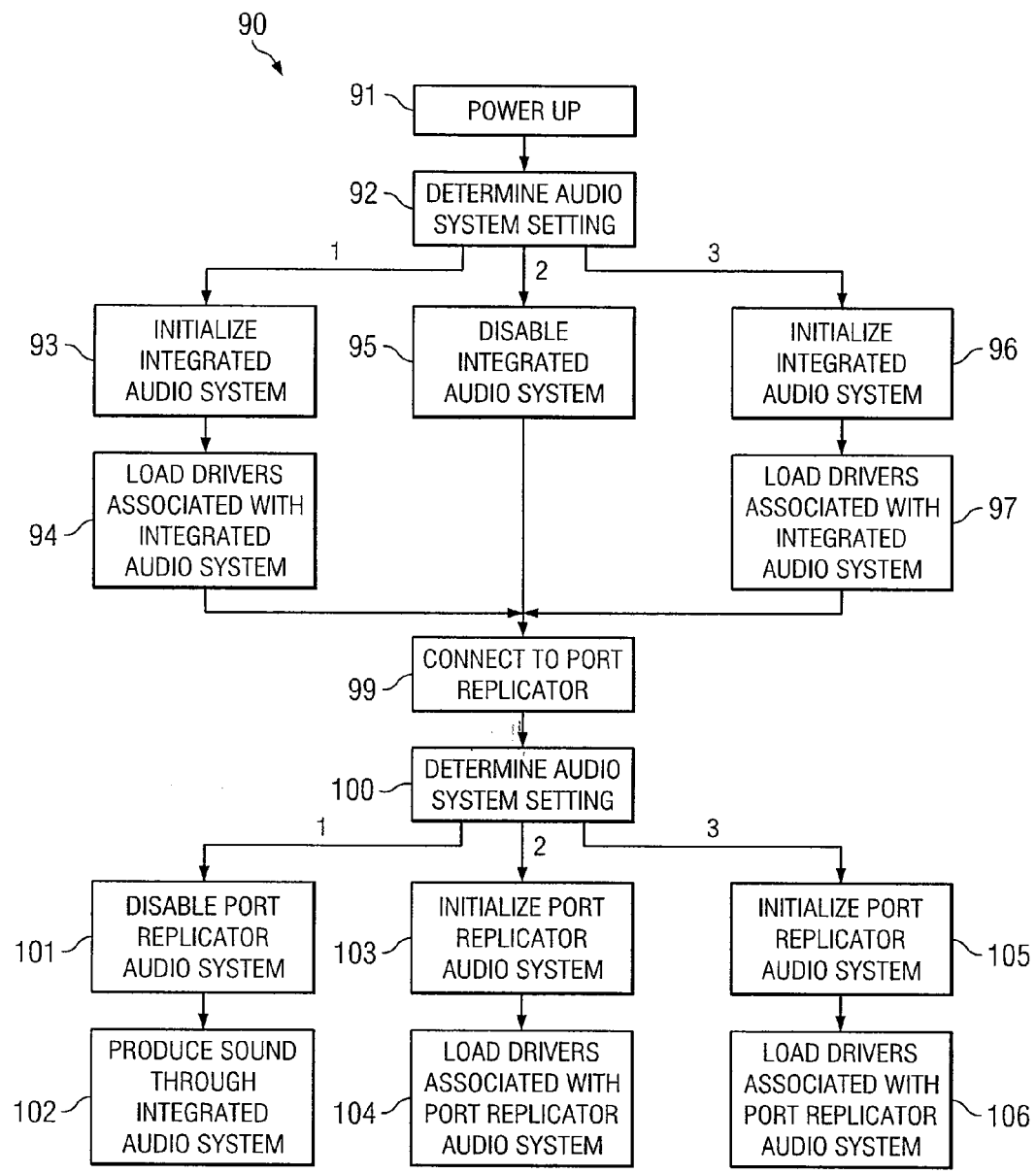
FIG. 7 depicts a flow diagram illustrating a method for providing an audio system for a mobile information handling device.

FIG. 7 depicts a flow diagram illustrating a method 90 for providing an audio system for a mobile information handling device. Method 90 may be used to provide an audio system for a mobile information handling device if it is powered up while not connected to port replicator 30, but is later connected to port replicator 30.

At Step 91, the mobile information handling device may begin the power up process. This may occur in reaction to a regularly scheduled power up, a reboot, or any user initiated start up.

At Step 92, the mobile information handling device may determine the audio system setting. In one embodiment, Step 92 may be conducted by a boot monitor associated with the mobile information handling system. For example, as shown in FIG. 7, there may be three options for setting the audio system. In this embodiment, the three settings may be: (1) use integrated audio system 20; (2) use port replicator audio system 40; or (3) automatic. The automatic setting may include using any available port replicator audio system 40 if available, and otherwise using integrated audio system 20.

For option 1, at Step 93, the mobile information handling device may initialize integrated audio system 20. In one embodiment, Step 93 may be conducted by a boot monitor associated with the mobile information handling system.

At Step 94, the mobile information handling device may load one or more drivers associated with integrated audio system 20. In one embodiment, Step 93 may be conducted by an operating system associated with the mobile information handling system.

For option 2, at Step 95, the mobile information handling device may disable integrated audio system 20. In one embodiment, Step 95 may be conducted by a boot monitor associated with the mobile information handling system. At Step 95, there is no need to load any audio drivers, so the mobile information handling device may not load any audio drivers.

For option 3, at Step 96, the mobile information handling device may initialize integrated audio system 20. In one embodiment, Step 96 may be conducted by a boot monitor associated with the mobile information handling system.

At Step 97, the mobile information handling device may load one or more drivers associated with integrated audio system 20. In one embodiment, Step 97 may be conducted by an operating system associated with the mobile information handling system.

At Step 99, the mobile information handling device, already powered up and operational may be connected to port replicator 30. This is commonly known as a "warm docking" procedure. In contrast, connecting a mobile information handling device to port replicator 30 while powered off may be known as a "cold docking" procedure.

At Step 100, the mobile information handling device may once again determine the audio system setting. In some example embodiments, the mobile information handling device may use the setting determined in Step 92. In one embodiment, Step 100 may be conducted by an operating system associated with the mobile information handling system. In another embodiment, Step 100 may be conducted by firmware associated with port replicator 30.

At Step 101, Option 1, the mobile information handling device may disable port replicator audio system 40. In one embodiment, Step 101 may be conducted by an operating system associated with the mobile information handling system. In another embodiment, Step 101 may be conducted by firmware associated with port replicator 30.

At Step 102, the mobile information handling device may produce sound through integrated audio system 20.

At Step 103, option 2, the mobile information handling device may initialize port replicator audio system 40. In one embodiment, Step 103 may be conducted by an operating system associated with the mobile information handling system. In another embodiment, Step 103 may be conducted by firmware associated with port replicator 30.

At Step 104, the mobile information handling device may load one or more drivers associated with port replicator audio system 40. In one embodiment, Step 104 may be conducted by an operating system associated with the mobile information handling system. Once the mobile information handling device has completed Step 104, sound may be directed to speakers 50.

At Step 105, Option 3, the mobile information handling device may initialize port replicator audio system 40. In one embodiment, Step 105 may be conducted by an operating system associated with the mobile information handling system. In another embodiment, Step 105 may be conducted by firmware associated with port replicator 30.

At Step 106, the mobile information handling device may load one or more drivers associated with port replicator audio system 40. In one embodiment, Step 106 may be conducted by an operating system associated with the mobile information handling system. Once the mobile information handling device has completed Step 106, sound may be directed to speakers 50. As an additional option, at Step 106, the mobile information handling device may disable integrated audio system 20. After Step 106 is complete, the mobile information handling device may produce sound through port replicator audio system 40.

Although the disclosed embodiments have been described in detail, it should be understood that various changes, substitutions and alterations can be made to the embodiments without departing from their spirit and scope.

What is claimed is:

1. An audio system for an information handling system, the audio system comprising:
    an audio interface configured to provide a connection between a mobile information handling device and a port replicator;
    an audio module in the port replicator, the audio module configured to receive sound data from the mobile information handling device via the audio interface;
    an audio jack for coupling the audio module to a speaker;
    a dedicated power rail in the port replicator coupling the audio module and a power supply unit associated with the port replicator for providing electrical energy to the audio module; and
    a second power rail in the port replicator for providing electrical energy to other elements of the port replicator other than the audio module.

2. The audio system of claim 1, wherein the audio interface includes a PCI Express interface.

3. The audio system of claim 1, wherein the audio interface includes a PCI interface.

4. The audio system of claim 1, wherein the audio interface includes a USB interface.

5. The audio system of claim 1, wherein the audio interface includes a high definition audio (HDA) interface.

6. The audio system of claim 1, wherein the audio jack includes six ports.

7. The audio system of claim 1, wherein the audio module provides high definition 7.1 channel audio.

8. The audio system of claim 1, wherein the mobile information handling device is a laptop computer.

9. The audio system of claim 1, wherein the mobile information handling device is a tablet computer.

10. An information handling system comprising:
    a mobile information handling device including an audio controller;
    a port replicator;
    an audio module in the port replicator, the audio module configured to receive sound data from the mobile information handling device;
    an audio interface configured to transfer sound data from the audio controller of the mobile information handling device to the audio module within the port replicator; and
    an audio jack for coupling the audio module to a speaker;
    a dedicated power rail in the port replicator coupling the audio module and a power supply unit associated with the port replicator for providing electrical energy to the audio module; and
    a second power rail in the port replicator for providing electrical energy to other elements of the port replicator other than the audio module.

11. The information handling system of claim 10, wherein the audio interface includes a PCI Express interface.

12. The information handling system of claim 10, wherein the audio jack includes six ports.

13. The information handling system of claim 10, wherein the audio module provides high definition 7.1 channel audio.

* * * * *